Dec. 10, 1963   L. KRAMER   3,113,527
PUMP OR MOTOR SHAFT AND ROTOR COUPLING MEANS
Filed Aug. 1, 1962   3 Sheets-Sheet 1

INVENTOR
LEO KRAMER
BY
HIS ATTORNEY

Dec. 10, 1963     L. KRAMER     3,113,527
PUMP OR MOTOR SHAFT AND ROTOR COUPLING MEANS
Filed Aug. 1, 1962     3 Sheets-Sheet 2
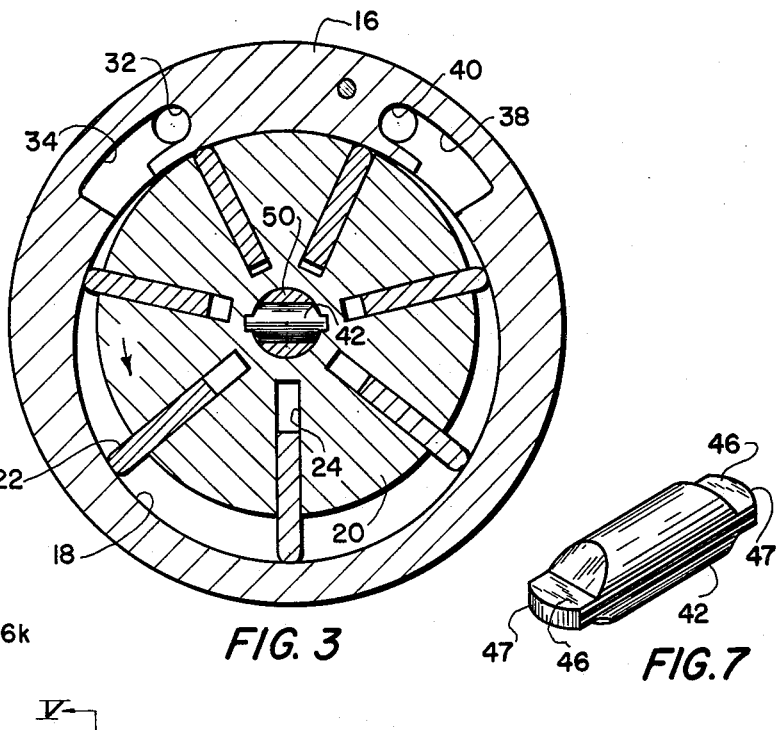
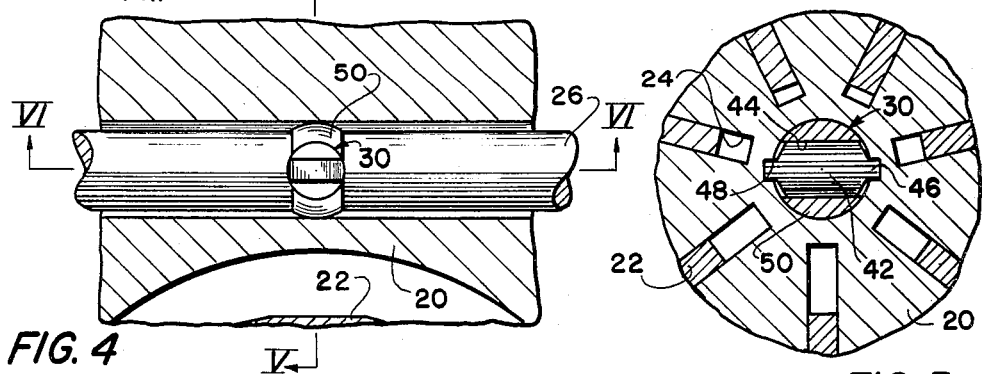
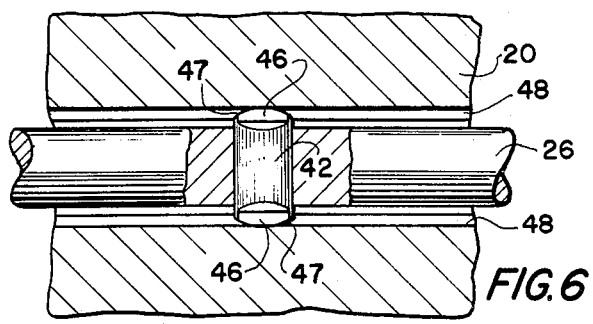
INVENTOR
LEO KRAMER
BY
HIS ATTORNEY

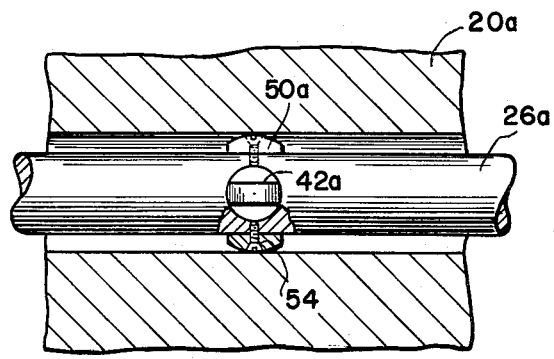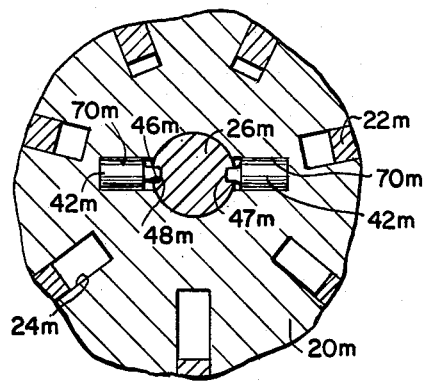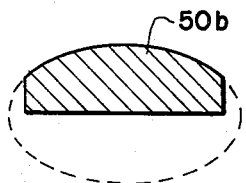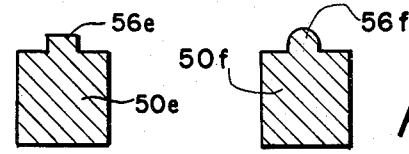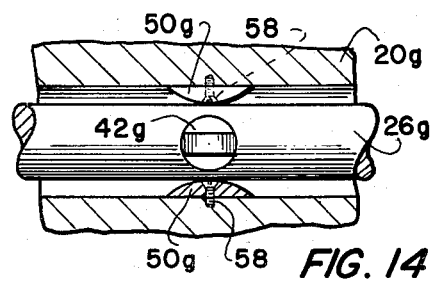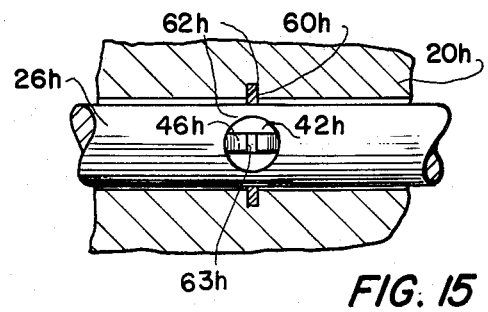

United States Patent Office 3,113,527
Patented Dec. 10, 1963

3,113,527
PUMP OR MOTOR SHAFT AND ROTOR COUPLING MEANS
Leo Kramer, Athens, Pa., assignor to Ingersoll-Rand Company, New York, N.Y., a corporation of New Jersey
Filed Aug. 1, 1962, Ser. No. 214,079
17 Claims. (Cl. 103—136)

The present invention relates to pneumatic and hydraulic tools and more particularly to an improved coupling means for such tools.

Heretofore in the manufacture of pneumatic and hydraulic tools such as air or hydraulic motors and pumps, the rotor (usually of the same type and of the type shown in U.S. Patent No. 2,762,312 issued September 11, 1956 to C. E. Adams et al., and U.S. Patent No. 2,853,023 issued September 23, 1958 to J. R. English) is often adapted to reciprocate with respect to the longitudinal axis of the associated shaft but is not adapted to oscillate with respect to such longitudinal axis. As a result it is difficult to maintain the end faces of the vane type rotor parallel to the adjacent faces of the end plates. In order to prevent interference between rotor and end plates which are not parallel it is necessary to increase the clearance between the end faces of the rotor and such adjacent faces of the end plates with a resultant decrease in efficiency of the motor or pump.

In non-analogous arts where the problem to be solved and the thing operated on are different, conventional coupling devices are of the type shown in U.S. Patent No. 1,692,638 issued November 20, 1928 to E. P. Edwards; U.S. Patent No. 1,767,371 issued June 24, 1930 to R. S. Kelso; U.S. Patent No. 1,887,106 issued November 8, 1932 to D. D. Shierk; U.S. Patent No. 1,940,779 issued December 26, 1933 to V. P. Williams; U.S. Patent No. 2,153,093 issued April 4, 1939 to W. V. Magee et al.; U.S. Patent No. 2,305,595 issued December 22, 1942 to E. R. Backus; U.S. Patent No. 2,563,535 issued August 7, 1951 to L. S. Kupersmith; U.S. Patent No. 2,752,765 issued July 3, 1956 to E. Wildhaber; and U.S. Patent No. 2,926,510 issued March 1, 1960 to J. Z. De Lorean.

It is the general object of the present invention to avoid and overcome the foregoing and other difficulties of and objections to prior art practice by the provision of an improved coupling means for a driven member and a driving member for a tool, which coupling means permits less clearance between the housing and the driving member with resultant increased efficiency of the tool due to reduced fluid leakage and losses.

A further object of the present invention is the provision of an improved coupling means which is simple and rugged in structure but inexpensive to fabricate and to maintain.

Another object of the present invention is the provision of an improved coupling means which is readily adapted for use with a wide range of sizes of driven members and driving members.

A still further object of the present invention is the provision of an improved coupling means which provides a solid connection between a driven member and a driving member, which connection will have a long service life.

Yet another object of the present invention is the provision of an improved coupling means for a driven member and a driving member which coupling means is easy to assemble and disassemble.

The aforesaid objects of the present invention and other objects which will become apparent as the invention proceeds, are achieved by providing an improved coupling means for a driven member and a driving member, which improved coupling means comprises a first means for connecting the driven member to the driving member while permitting relative reciprocable movement therebetween and a second means operatively associated with the driven member and the driving member for permitting relative oscillatory and axial movement therebetween.

Although the principles of the present invention are broadly applicable to air or hydraulic motors and pumps, the present invention is particularly adapted for use in conjunction with an air motor and hence it has been so illustrated and will be so described.

For a better understanding of the present invention, reference should be made to accompanying drawings wherein like numerals of reference indicate several parts throughout the views and wherein:

FIG. 3 is an enlarged vertical sectional view along the line III—III of FIG. 1 in the direction of the arrows with the housing removed for clarity;

FIG. 4 is an enlarged fragmentary vertical sectional view similar to FIG. 1 of the driving member and the driven member;

FIG. 5 is a fragmentary vertical sectional view along the line V—V of FIG. 4 in the direction of the arrows;

FIG. 5A is a fragmentary view in perspective of an alternative embodiment of the arcuate enlargement of the coupling means;

FIG. 6 is a fragmentary horizontal sectional view along the line VI—VI of FIG. 4 in the direction of the arrows;

FIG. 7 is a perspective view of a pin utilized in the improved coupling means;

FIG. 8 is a view similar to FIG. 4 of another alternative embodiment of the coupling means;

FIGS. 9–13 are enlarged fragmentary views of alternative embodiments of the arcuate enlargement of the coupling means;

FIG. 14 is a view similar to FIG. 4 showing the enlargement carried by the rotor;

FIG. 15 is a view similar to FIG. 14 showing the enlargement disposed between the rotor and the shaft; and FIG. 16 is a view similar to FIG. 5 of a further alternative embodiment.

Figure 1:
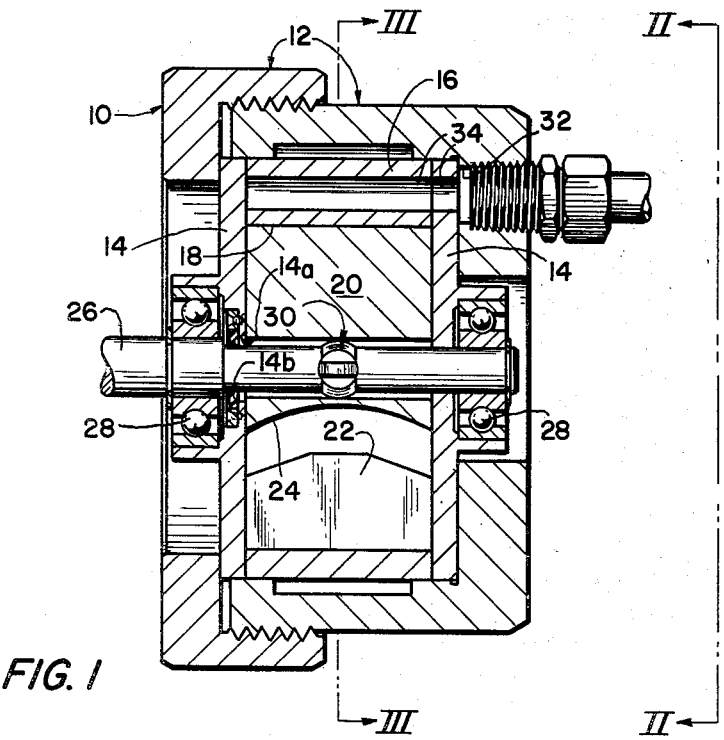
FIG. 1 is a vertical sectional view taken along the line I—I of FIG. 2 in the direction of the arrows of an air motor incorporating the improved coupling means of the present invention.

With specific reference to the form of the present invention illustrated in the drawings, and referring particularly to FIG. 1, a fluid motor, such as an air motor, is indicated generally by the reference numeral 10. Contained within a housing 12 (FIGS. 1, 2) of the air motor 10 are end plates 14, a cylinder or bushing 16 having a cavity 18 eccentrically bored with respect to such cylinder 16 (FIGS. 1, 3), a driving member, such as a rotor 20 (FIGS. 1, 3, 6), provided with a plurality of vanes or blades 22 reciprocable in slots 24 in the rotor 20, and a driven member, such as a shaft 26 (FIGS. 1, 2, 3, 4, 6), rotatable on bearings 28 in the end plates 14 and connected to the rotor 20 by the improved coupling means 30 (FIGS. 1, 4, 5) of the present invention.

*Operation*

Figure 2:
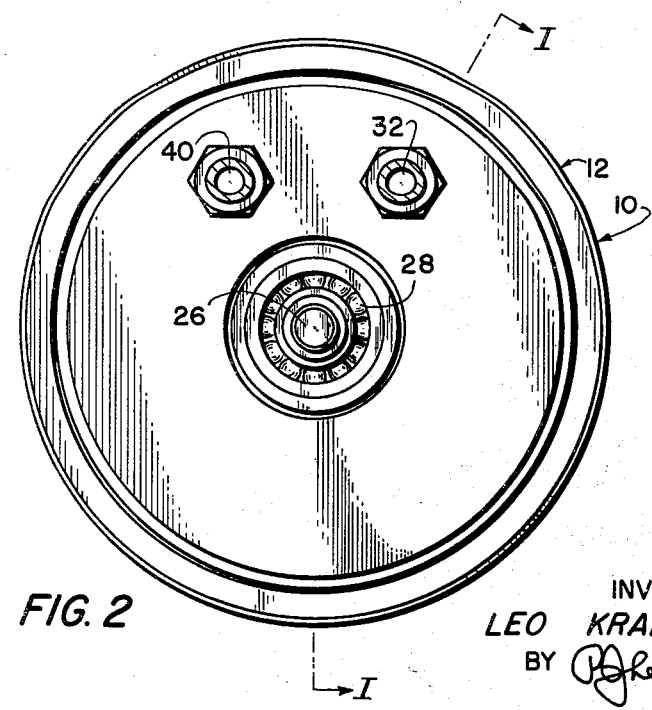
FIG. 2 is a side elevational view taken along the line II—II of FIG. 1 in the direction of the arrows.

In order to cause rotation of the rotor 20 and shaft 26, a fluid, such as air, at high pressure is fed into air inlet 32 (FIG. 3), an air inlet port 34 and the cavity 18 to cause rotation of the blades 22, which blades 22 reciprocate in the slots 24. The high pressure air is exited from the cavity 18 by means of air outlet port 38 (FIG. 3) and air outlet 40 (FIGS. 2, 3). For the purpose of permitting relative longitudinal reciprocable movement between the rotor 20 and shaft 26 while also permitting relative oscillatory movement therebetween with attendant reduced clearances between the rotor 20 and end plates 14, and resultant minimized air losses and increased efficiency of the air motor 10, the improved coupling means of the present invention is utilized.

Coupling Means

Referring now to FIGS. 4-7 it will be appreciated that a first means which is utilized for connecting the rotor 20 to the shaft 26 while permitting relative reciprocable movement therebetween comprises a pin 42 rotatably disposed in a bore 44 (FIG. 5) in such shaft 26 and provided with keys 46 (FIGS. 5-7) which reciprocate in suitable keyways 48 in the rotor 20. The centerline of the bore 44 (FIG. 5) passes through and is at right angles to the axial centerline of the shaft 26. As shown in FIG. 7 the keys 46 are provided with rounded ends 47 to permit lateral oscillatory movement of the shaft 26 with respect to the keyways 48. The coupling means 30 is also provided with a second means comprising a circumferentially enlarged portion 50 (FIGS. 3, 4, 5) formed on shaft 26, which enlarged portion 50 is formed to provide a peripheral surface of arcuate configuration and which enlargement 50 is dimensioned so that the arcuate surface thereof engages the surface of the bore of rotor 20. Enlarged portion 50 serves to center shaft 26 in the bore of rotor 20. In operation, the enlarged portion 50 acts as a pivot point about which rotor 20 is permitted to oscillate relative to shaft 26. Pin 42 must be constructed and arranged in relation to bore 44 so that it is free to slightly rotate and thereby permit oscillatory movement of rotor 20 with respect to shaft 26 in a plane passing through the rotor centerline at an angle 90° from keyways 48.

To facilitate assembly of the above described fluid motor 10 the end wall 14 on the left side of the motor 10 as viewed in FIG. 1, is provided with an opening 14a which is of a diameter slightly larger than the diameter of the circumferential enlargement 50 on shaft 26 to permit passage of the latter through wall 14. A fluid seal 14b of conventional construction is provided to effect a substantially fluid tight joint between the shaft 26 and opening 14a.

It will be recognized by those skilled in the art that the coupling means of the present invention may have alternative forms shown in FIGS. 5A, 8-14.

Alternative Embodiments

In order to adopt the improved coupling means for use with a wide range of sizes of rotors 20 and shafts 26, the spherical enlargement 50a (FIG. 8) may be fabricated in the form of a collar and secured to the shaft 26a by means of a screw 54.

Alternatively the spherical enlargement 50a may be replaced as shown in FIGS. 9-13 by the ellipsoidal segment 50b (FIG. 9); the paraboloid segment 50c (FIG. 10); the hyperboloid segment 50d (FIG. 11); the cylindrical segment 50e provided with a square protuberance or lug 56e (FIG. 12); the cylindrical segment 50f having a rounded protuberance 56f; or, as shown in FIG. 5A, the spherical enlargement 50k may be provided with juxtaposed planar surfaces 80k which lie in a plane normal to the longitudinal axis of bore 44k.

As shown in FIG. 14 the annular enlargements 50g can be secured to the rotor 20g by means of screws 58 and engageable with the shaft 26g. In FIG. 15 a snap ring 60h is disposed in apertures 62h in the rotor 20h with the keys 46h provided with notches 63h (only one of which is shown) to receive snap ring 60h when such ring 60h is made of one piece construction.

In FIG. 16 a pair of pins 42m are rotatably disposed in boxes 70m in the rotor 20m and have their rounded ends 47m of the keys 46m disposed in keyways 48m in the shaft 26m.

It will be recognized by those skilled in the art, that the objects of the present invention have been achieved by the provision of an improved coupling means for a tool which coupling means permits less clearance between the housing and the driving member with attendant reduced fluid leakage therebetween and increased efficiency of the tool. This coupling means is easy to assemble and disassemble; is simple and rugged in structure; is inexpensive to fabricate and to maintain; is adapted for use with a wide range of sizes of driving members and driven members; and provides a solid long lasting connection between the driving member and driven member.

While in accordance with the patent statutes, one best known embodiment of the present invention has been described in detail, it is to be particularly understood that the invention is not limited thereto or thereby.

I claim:
1. Coupling means for connecting a shaft of a fluid pump or motor to a rotor of said pump or motor or aligning said rotor with end plates of said fluid pump or motor, said coupling comprising:
   (a) said rotor being provided with a cylindrical rotor bore,
   (b) said shaft extending into said cylindrical rotor bore, bearing means associated with said shaft for supporting said shaft,
   (c) one of said rotor and said shaft being provided with a pin bore, disposed substantially at right angles to the center line of said shaft,
   (d) the other of said rotor and said shaft being provided with opposed keyways,
   (e) a pin rotatably disposed in said pin bore to permit oscillatory movement of said rotor with respect to said shaft in a plane passing through the center line of the rotor at an angle about 90° from said keyways,
   (f) said pin having keys provided with rounded ends to permit lateral oscillatory movement of said shaft with respect to said keyways, and
   (g) an arcuate enlargement on one of said cylindrical rotor bore and said shaft and engageable with the other of said cylindrical rotor bore and said shaft thereby centering said shaft in said cylindrical rotor bore and permitting limited relative movement between said rotor and said shaft to align said rotor with said end plates.

2. The coupling means recited in claim 1 wherein said shaft is provided with said pin bore.

3. The coupling means recited in claim 1 wherein said rotor bore is provided with said pin bore.

4. The coupling means recited in claim 1 wherein said shaft is provided with said keyways.

5. The coupling means recited in claim 1 wherein said rotor bore is provided with said keyways.

6. The coupling means recited in claim 1 wherein said arcuate enlargement is on said shaft.

7. The coupling means recited in claim 1 wherein said arcuate enlargement is on said rotor bore.

8. The coupling means recited in claim 1 wherein said arcuate enlargement is removably secured to said one of said shaft and said rotor bore.

9. The coupling means recited in claim 1 wherein said arcuate enlargement is on said shaft, said arcuate enlargement being oscillatable on said rotor bore.

10. The coupling means recited in claim 1 wherein said arcuate enlargement is on said rotor bore, said arcuate enlargement being oscillatable on said driven member.

11. The coupling means recited in claim 1 wherein said arcuate enlargement is a spherical segment.

12. The coupling means recited in claim 1 wherein said arcuate enlargement is a segment of an ellipsoid.

13. The coupling means recited in claim 1 wherein said arcuate enlargement is a segment of a paraboloid.

14. The coupling means recited in claim 1 wherein said arcuate enlargement is a segment of a hyperboloid.

15. The coupling means recited in claim 1 wherein said arcuate enlargement comprises a cylinder and a square protuberance on the periphery of said cylinder.

16. The coupling means recited in claim 1 wherein said arcuate enlargement comprises a cylinder and a rounded protuberance on the periphery of said cylinder.

17. The coupling means recited in claim 1 wherein said shaft and said rotor bore are provided with registering apertures and a snap ring is disposed in said apertures.

References Cited in the file of this patent

UNITED STATES PATENTS

| | | | |
|---|---|---|---|
| 294,877 | Jarvis | Mar. 11, | 1884 |
| 771,457 | Bullard | Oct. 4, | 1904 |
| 919,651 | Spicer | Apr. 27, | 1909 |
| 1,115,833 | Kennedy | Nov. 3, | 1914 |
| 1,210,200 | Pentony | Dec. 26, | 1916 |
| 1,225,174 | Ream | May 8, | 1917 |
| 1,262,561 | Ream | Apr. 9, | 1918 |
| 1,543,575 | Fishline | June 23, | 1925 |
| 1,630,886 | Beyer | May 31, | 1927 |
| 1,685,815 | Jennings | Oct. 2, | 1928 |
| 1,708,680 | Patrick | Apr. 9, | 1929 |
| 2,186,846 | Trbojevich | Jan. 9, | 1940 |
| 2,563,535 | Kupersmith | Aug. 7, | 1951 |
| 2,851,867 | Ferguson | Sept. 16, | 1958 |
| 2,964,928 | Marquis | Dec. 20, | 1960 |